Dec. 24, 1929.

J. KLEFFMAN

SNARE

Re. 17,534

Original Filed May 3, 1926

Inventor

JOHN KLEFFMAN.

By Geo. Turner.

Attorney

Reissued Dec. 24, 1929

Re. 17,534

UNITED STATES PATENT OFFICE

JOHN KLEFFMAN, OF HIBBING, MINNESOTA

SNARE

Original No. 1,615,586, dated January 25, 1927, Serial No. 106,496, filed May 3, 1926. Application for reissue filed August 6, 1927. Serial No. 211,241.

This invention relates to snares used in the catching of wild animals and the principal object sought is simplicity of construction, and efficiency as a snare.

Another object is that of providing a convenient unit of snare wire being adapted for double use, either as a snare for catching and killing the prey, or catching and holding it alive, and in either event the opposite end of the unit functioning as an anchoring means for the snare.

Still other objects and advantages of the invention will appear in the further description thereof.

Referring now to the accompanying drawing, forming part of this application, and wherein like reference characters indicate like parts:

Figure 1:
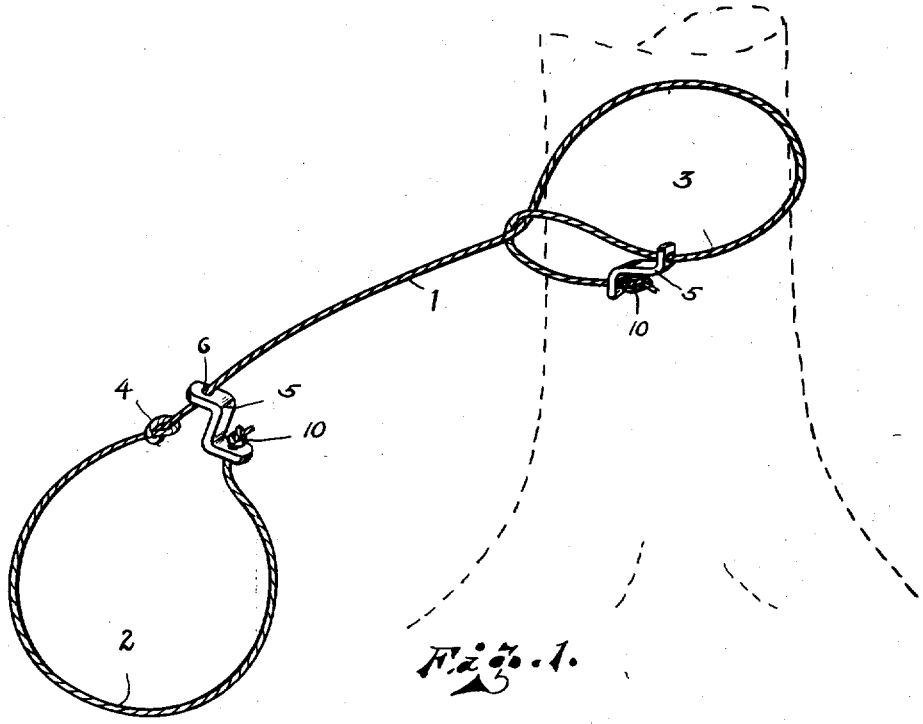
Figure 1 is a perspective view of one embodiment of the invention, illustrating the double functions of the snare.
Figure 2:
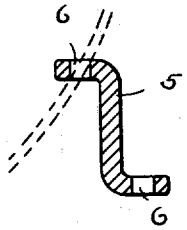
Figure 2 is an enlarged central sectional view of the catch.

The snare is preferably made of a suitable length of twisted cable wire 1 having a noose or loop formed upon either end thereof, the one indicated at 2 of which is for the purpose of catching and securely holding an animal alive, while the one indicated at 3 is for the purpose of catching and killing the animal, there being no limit to the reducing of the noose by slipping about the animal's neck, while the noose 2 is limited in that a knot 4 is formed at the predetermined distance from the end of the wire to prevent the catch 5 from slipping beyond same.

The catch 5 is composed of a piece of Z-shaped metal having suitably sized holes 6 formed adjacent the extremities thereof through one of which the extreme end of the wire 1 is threaded and secured against retraction by the knot 10, while the body portion of the wire is threaded through the other hole as clearly illustrated in the drawings, said wire being free to revolve or swivel therein.

Now the wire as before stated being of cable type is normally trying to straighten itself which results in the loops formed therein holding the catch in biting position upon the body portion of the wire, that is to say with the hole in the free end of the catch binding upon the wire, the latter being engaged by the diagonally opposite edges of the hole, so that at whatever sized noose the snare is set, it will remain until slipped tightly about some object.

By this unit of snare wire provided with a loop at either end it is obvious that a trapper is thus fully equipped with means for anchoring same regardless of which type of snare he wishes to set, in that he is enabled to slip one loop through the other about a tree or other object as an anchor and thus draw same tight, while the opposite end is set as a snare.

Figure 3:
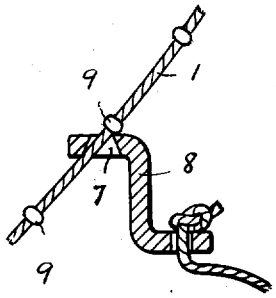
Figure 3 is an enlarged sectional view of a modified form of catch and wire assemblage.

In Figure 3 I have shown a modified form in that the hole 7 in the end of the Z-shaped catch 8 through which the body portion of the wire is roven is of slightly conical shape, and upon the body of the wire may be formed or fastened as by soldering or the like suitably spaced metal knobs or beads 9 which pay freely through the catch in one direction but in the other direction are caught by the edges of the smaller end of the hole and securely held.

Having thus described my invention, what I claim and desire to secure by Letters Patent, is:

1. The combination with a flexible noose, of a Z-shaped catch therefor having holes in the termini thereof whose axes are parallel with the central body portion of the catch, the end of the wire forming the noose being permanently fixed in one end of the catch and the body portion of said wire freely movable through the hole in the other end of the catch.

2. A snare for catching animals comprising a snare wire which normally tends to straighten itself, and a catch therefor to one end of which the wire is fixed and having a hole therein through which the body portion of the wire may freely pay axially but normally becomes bound therein whether in set position or holding an animal.

In witness whereof, I have hereunto set my hand this 4th day of August, 1927.

JOHN KLEFFMAN.